W. P. WAUGH.
GLAZING CONSTRUCTION.
APPLICATION FILED MAY 9, 1917.
1,243,020.
Patented Oct. 16, 1917.
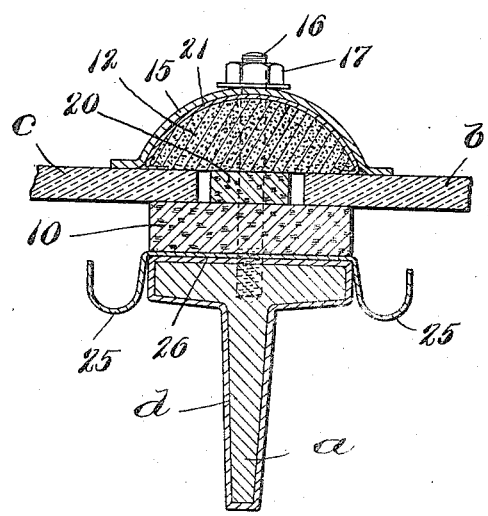
Inventor
William P. Waugh
by Jas. H. Churchill
atty.

UNITED STATES PATENT OFFICE.

WILLIAM P. WAUGH, OF SEWICKLEY, PENNSYLVANIA, ASSIGNOR TO ASBESTOS PROTECTED METAL COMPANY, OF PITTSBURGH, PENNSYLVANIA, A CORPORATION OF PENNSYLVANIA.

GLAZING CONSTRUCTION.

1,243,020.  Specification of Letters Patent.  Patented Oct. 16, 1917.

Application filed May 9, 1917.  Serial No. 167,507.

*To all whom it may concern:*

Be it known that I, WILLIAM P. WAUGH, a citizen of the United States, and a resident of Sewickley, in the county of Allegheny and State of Pennsylvania, have invented an Improvement in Glazing Construction, of which the following description, in connection with the accompanying drawings, is a specification, like characters on the drawings representing like parts.

This invention relates to a novel glazing construction, which is especially adapted to be employed in the construction of skylights, saw tooth fronts, monitor and other sash and the like. For purposes of simplification the glazing construction will be hereinafter referred to as a skylight construction.

The invention has for its object to provide a skylight construction, which is capable of sustaining substantially heavy loads without developing leaks, especially in the presence of relatively high temperatures. To this end, I employ a skylight construction having a rigid glass supporting member carrying a resilient member of cork or other non-plastic material upon which the glass rests, and a sealing member of plastic water-repelling and more or less elastic material, preferably asphalt or combinations thereof which rests on the upper surface of the glass and adheres to the same so as to form an effective seal on the upper surface of the glass, which seal is not broken by movement of the glass under substantially heavy loads, especially in the presence of relatively high temperatures, as will be described.

These and other features of this invention will be pointed out in the claims at the end of this specification.

The drawing represents in section a sufficient portion of a skylight construction to enable the invention to be understood.

Referring to the drawing *a* represents a rigid frame or support for adjacent panes *b*, *c*, of glass, which frame is herein shown as a T-bar provided with a covering *d* of asbestos paper, felt or other protective material. The glass panes *b*, *c*, rest upon a resilient member 10 of cork or other non-plastic material, which is supported by the frame *a*. The cork member 10 is located below the glass panes *b*, *c*, and while resilient is capable of sustaining a relatively heavy load, as for instance a layer of snow upon the upper surface of the glass, but such member is not of itself capable of making a weather-tight joint with the glass, and therefore the skylight construction is provided with a sealing member 12 of plastic water-repelling material, such as asphalt or combinations or mixtures thereof, which is located above the glass panes *b*, *c*, and makes such close and intimate contact with said upper surfaces as to form a weather-tight joint on the upper surfaces of the glass panes, which prevents leakage of moisture into the building.

The plastic sealing member is located within and substantially fills a metal cap, plate or member 15, which is fastened to the rigid member *a* as by bolts 16, and nut 17. The space between the plastic member 12 and the cork cushion or resilient member 10 between the panes *b*, *c*, may be filled or substantially filled by a glass separator 20 which may be a strip of cork or of plastic material. The plastic member 12 may be provided on its outer surface with a protective covering 21 of asbestos paper, felt or the like. The sealing member 12 as above stated contacts with the upper surface of the glass *b*, *c*, and being plastic forms a close and intimate contact with said upper surface, filling any irregularities, depressions and the like in said surfaces, thereby making a weather-tight joint with the upper surface of the glass and effectively sealing the same against leakage of moisture from the upper to the under surface of the glass, and this liquid-tight joint or seal is maintained and is not broken by movement of the glass downward under load, especially in the presence of relatively high temperatures, or when moved upward by said resilient member when relieved of said load, as the plastic nature of the member 12 imparts sufficient elasticity to it to permit such movements of the glass to take place without breaking the seal, and the non-plastic resilient nature of the supporting member 10 prevents the latter from being distorted or otherwise detrimentally affected under such conditions.

Furthermore the cork member 10 is more easily handled, especially in cold weather, as it is not liable to fracture.

The plastic member 12 is non-absorbent, is readily moldable to fit the cap and fill the same so as to prevent water of condensation being formed within the latter. The skylight construction may and preferably will be provided with gutters 25 formed in a sheet metal plate 26 which is fitted over the bolts 16 and is supported by the rigid member $a$.

It is preferred to make the non-plastic resilient member 10 of cork, and the plastic member 12 of asphalt either substantially pure or mixed with other materials, but it is not desired to limit the invention to the particular materials specified.

Claims:

1. In a glazing construction, in combination, a rigid frame, a non-plastic resilient member supported by said frame, glass panes supported by said resilient member, a sealing member of plastic water-repelling material contacting with the upper surfaces of the said glass panes and adhering thereto to form a moisture seal on the upper surfaces of said glass panes, a cap plate covering said sealing member, and means for securing said cap plate in fixed relation to said rigid frame.

2. In a glazing construction, in combination, a rigid frame, a resilient member of cork supported by said frame, glass panes supported by said cork member, a sealing member of asphalt contacting with the upper surfaces of the glass panes and adhering thereto to form a moisture seal on the upper surfaces of said glass panes, a cap plate covering said sealing member, and means for securing said cap plate in fixed relation to said rigid frame.

In testimony whereof, I have signed my name to this specification.

WILLIAM P. WAUGH.